(12) United States Patent
Roberson

(10) Patent No.: US 11,045,884 B2
(45) Date of Patent: Jun. 29, 2021

(54) SYSTEMS AND METHODS OF A GUIDE FOR WIDENING AN EXISTING DRILLED HOLE

(71) Applicant: Michael Richard Roberson, Scotts Valley, CA (US)

(72) Inventor: Michael Richard Roberson, Scotts Valley, CA (US)

( * ) Notice: Subject to any disclaimer, the term of this patent is extended or adjusted under 35 U.S.C. 154(b) by 0 days.

(21) Appl. No.: 16/749,799

(22) Filed: Jan. 22, 2020

(65) Prior Publication Data

US 2020/0338648 A1 Oct. 29, 2020

Related U.S. Application Data

(60) Provisional application No. 62/840,291, filed on Apr. 29, 2019.

(51) Int. Cl.
*B23B 51/00* (2006.01)
*B23B 51/04* (2006.01)
*B23B 47/28* (2006.01)

(52) U.S. Cl.
CPC ........ *B23B 51/0018* (2013.01); *B23B 47/287* (2013.01); *B23B 51/0426* (2013.01); *B23B 2247/12* (2013.01)

(58) Field of Classification Search
CPC ............ B23B 51/0018; B23B 51/0036; B23B 51/0426; B23B 47/287; B23B 2247/12; B23B 2251/60; B23B 2251/603; B23B 2251/606; B23B 2260/142; B23B 2270/20; Y10T 408/558; Y10T 408/5583; Y10T 408/563; Y10T 408/56337; Y10T 408/885; Y10T 408/8928; Y10T 408/8973
See application file for complete search history.

(56) References Cited

U.S. PATENT DOCUMENTS

| | | | | |
|---|---|---|---|---|
| 5,743,682 A | * | 4/1998 | Chaney, Sr. | ........ B23B 51/0426 408/204 |
| 5,871,310 A | * | 2/1999 | Mortensen | .......... B23B 51/0426 408/1 R |
| 9,925,600 B2 | * | 3/2018 | Hsu | ...................... B23B 51/0054 |
| 2016/0279716 A1 | * | 9/2016 | Gamboa Arias | .... B23B 51/0426 |

* cited by examiner

*Primary Examiner* — Chwen-Wei Su
(74) *Attorney, Agent, or Firm* — Carr & Ferrell LLP

(57) ABSTRACT

The present technology presents system of a guide for widening a drilled hole. In various embodiments the system comprises a hub including a circular central member and a plurality of slots for shims around a circumference of the circular central member. Embodiments include a plurality of shims with the plurality of shims being fit into the plurality of slots around the circumference of the circular central member. Furthermore, the plurality of shims each include a narrow end and a wide end with the narrow end of each of the plurality of shims being in a same direction and the wide end of each of the plurality of shims being in an opposite direction to the narrow end allowing for the guide to fit securely into the existing hole before drilling the new hole.

20 Claims, 11 Drawing Sheets

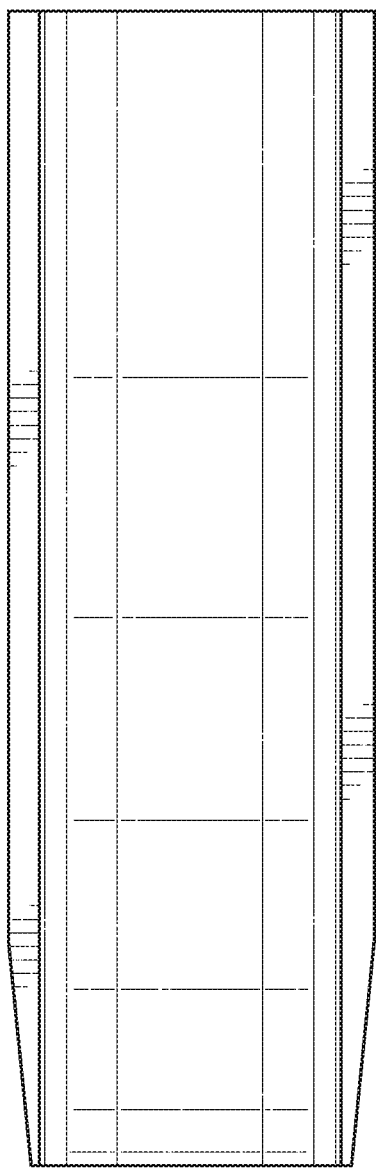
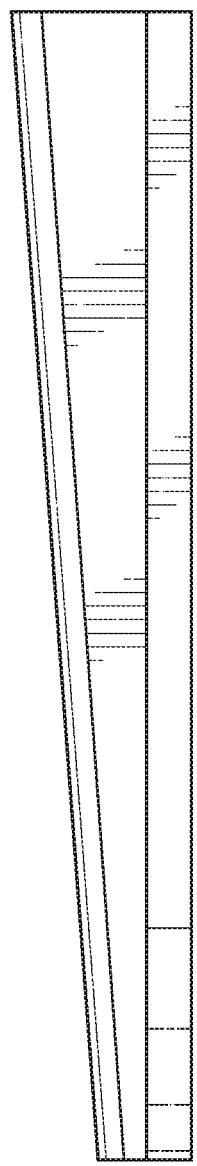
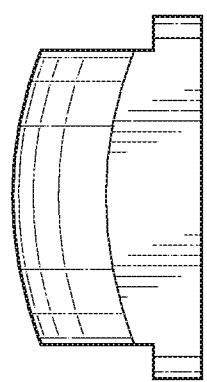
FIG. 5B
FIG. 5C
FIG. 5A

SYSTEMS AND METHODS OF A GUIDE FOR WIDENING AN EXISTING DRILLED HOLE

CROSS-REFERENCE TO RELATED APPLICATION

This patent application claims the benefit of Provisional Patent Application Ser. No. 62/840,291, filed Apr. 29, 2019, titled "Guide for Widening a Drilled Hole Systems and Methods." The aforementioned disclosure is hereby incorporated by reference herein in its entirety including all references cited therein.

FIELD OF THE PRESENT TECHNOLOGY

The present technology relates generally to a tool that can be placed in an existing hole to lock in a drill and hole saw so that the drill is held in place while a wider hole is drilled. In some embodiments, the present technology pertains to drilling holes in doors and cabinets for lock placement and access for wires.

SUMMARY OF THE PRESENT TECHNOLOGY

According to some embodiments, the present technology may be directed to a system for drilling a larger hole in a door or cabinet over an existing hole. In some embodiments the hole to be enlarged will be on a door. In some embodiments the existing hole may be on a desk, a cabinet, or a countertop. The surface to be drilled out may consist of wood, metal, stone, concrete, or another material. A door, cabinet, or desk may be installed or free standing.

In some embodiments the present technology includes a system of a guide for widening a drilled hole, the system comprising: (I) a hub, comprising: (i) a circular central member with a center location, the circular central member comprising: (ii) a bearing; and (iii) a bearing retainer; and (iv) a plurality of slots for shims around a circumference of the circular central member; and (II) a plurality of shims, the plurality of shims being fit into the plurality of slots around the circumference of the circular central member, the plurality of shims each comprising a narrow end and a wide end, the narrow end of each of the plurality of shims being in a same direction and the wide end of each of the plurality of shims being in an opposite direction to the narrow end allowing for the guide to fit securely into an existing hole before drilling a new hole.

In various embodiments the bearing is free spinning. In some instances, the bearing fits a standard drill bit. the bearing and the bearing retainer are in the center location of the circular central member allowing the new hole to be drilled in a center of the existing hole. In some embodiments the bearing and the bearing retainer are off-center from the center location of the circular central member allowing the new hole to be drilled off-center of the existing hole.

In some embodiments the plurality of slots around the circumference of the circular central member are grooves in the circular central member. In various embodiments the plurality of slots around the circumference of the circular central member are equidistantly placed around the circumference of the circular central member. In other embodiments the plurality of slots around the circumference of the circular central member are not equidistantly placed around the circumference of the circular central member.

In some embodiments the plurality of shims fit into the plurality of slots around the circumference of the circular central member are a same size. In other embodiments the plurality of shims fit into the plurality of slots around the circumference of the circular central member are not a same size.

In some embodiments the plurality of slots around the circumference of the circular central member comprise three shims are equidistantly placed around the circumference of the circular central member. In various embodiments the plurality of slots around the circumference of the circular central member comprise three slots, the three slots being equidistantly placed around the circumference of the circular central member. In various instances the plurality of slots around the circumference of the circular central member comprise six slots, the six slots being equidistantly placed around the circumference of the circular central member.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Certain embodiments of the present technology are illustrated by the accompanying figures. It will be understood that details not necessary for an understanding of the technology or that render other details difficult to perceive may be omitted. It will be understood that the technology is not necessarily limited to the particular embodiments illustrated herein.

Figure 1:
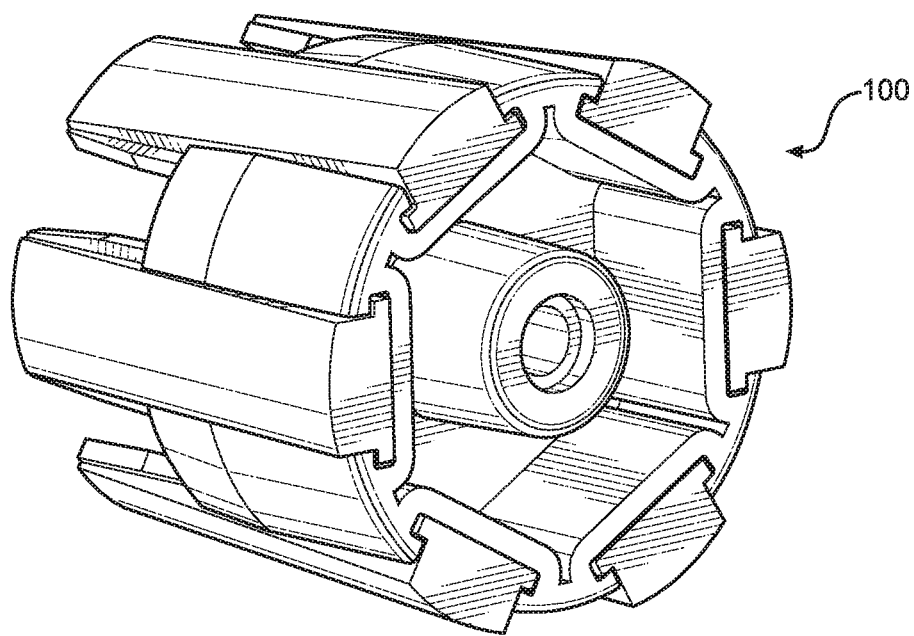

FIG. 1 illustrates a system of a guide for widening an existing drilled hole according to exemplary embodiments of the present technology.

Figure 2:
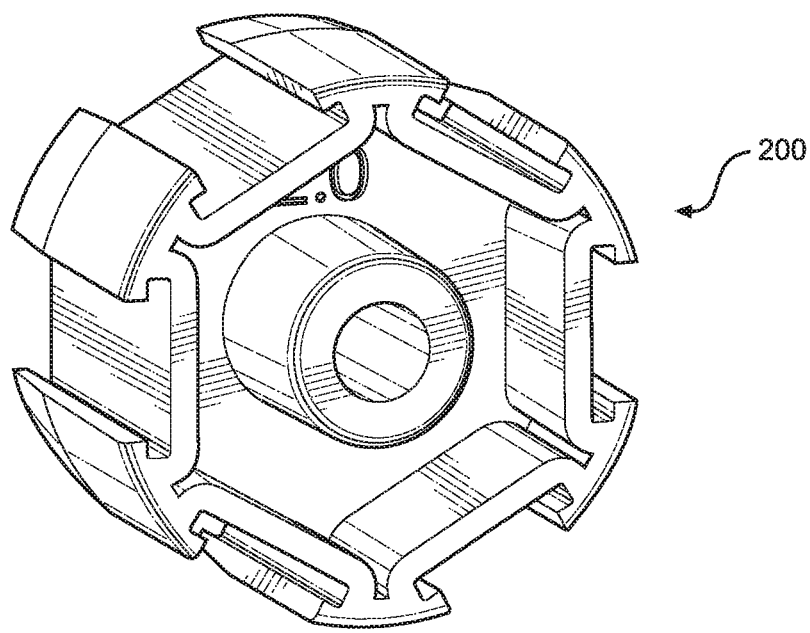

FIG. 2 illustrates a central hub of a system of a guide for widening an existing drilled hole according to exemplary embodiments of the present technology.

Figure 3A:
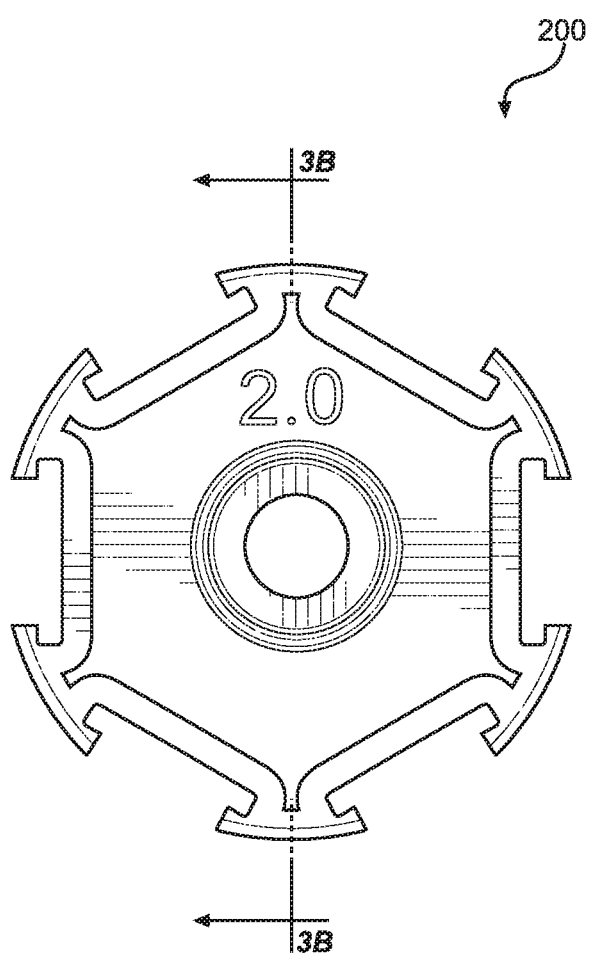

FIG. 3A shows a top view of a hub of a system of a guide for widening an existing drilled hole according to exemplary embodiments of the present technology.

Figure 3B:
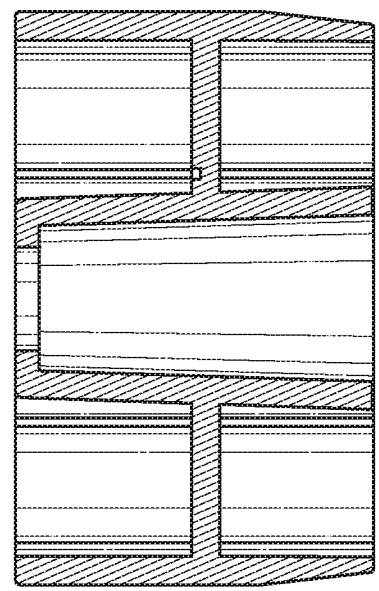

FIG. 3B shows a cross-section view of a hub of a system of a guide for widening an existing drilled hole according to exemplary embodiments of the present technology.

Figure 4:
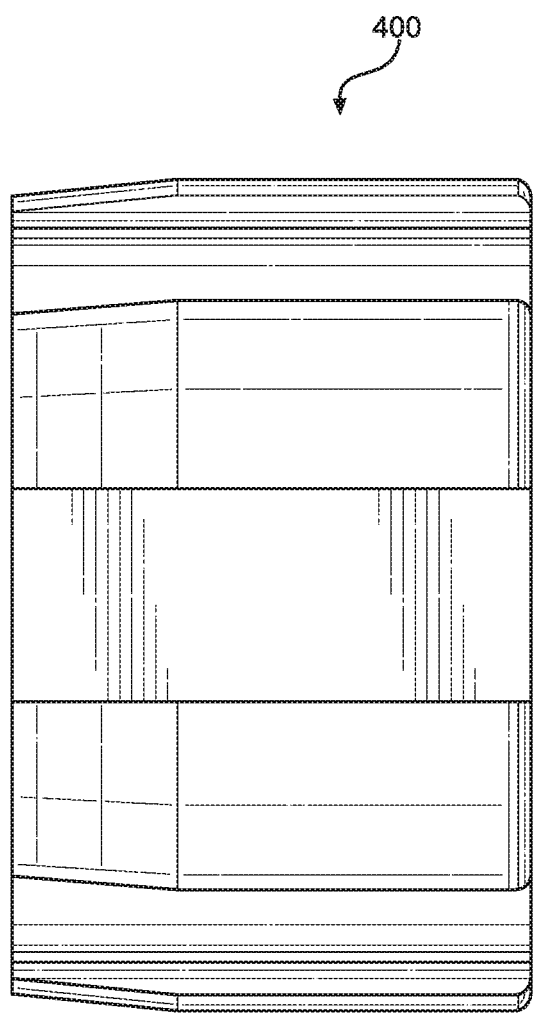
Figure 6A:
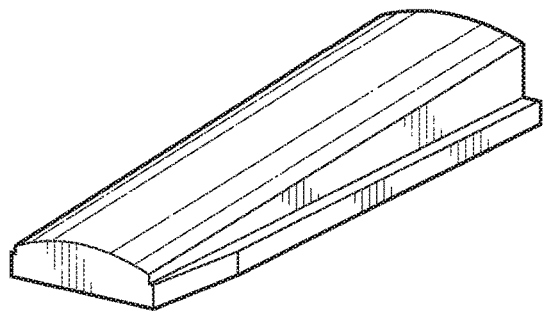
Figure 6B:
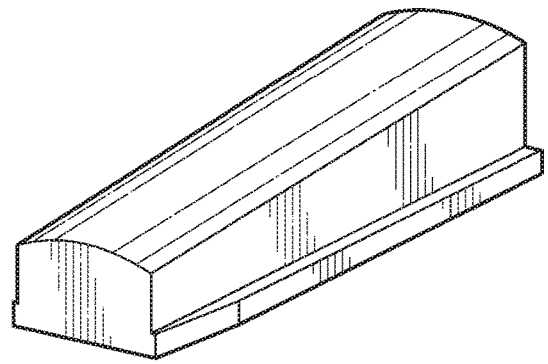
Figure 6C:
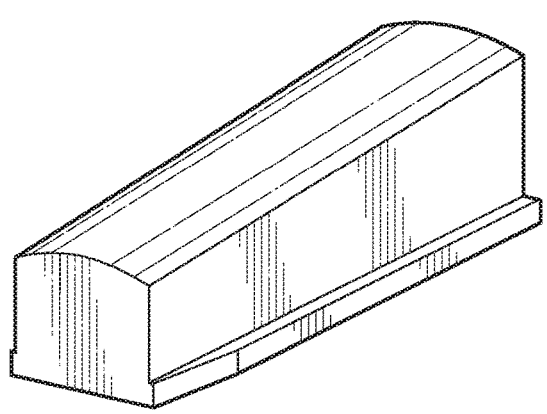
Figure 6D:
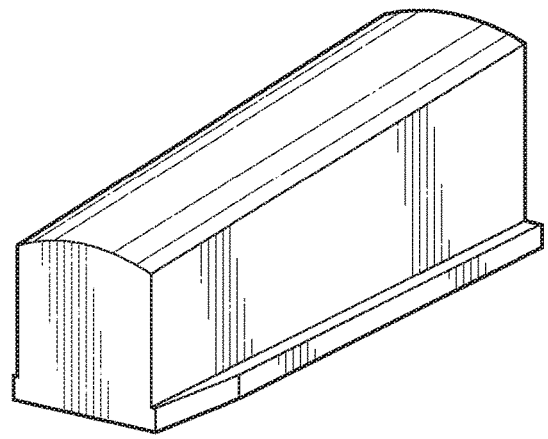

FIG. 4 shows a side view of a hub of a system of a guide for widening an existing drilled hole according to exemplary embodiments of the present technology.

FIG. 5A illustrates a top view of a shim of a system of a guide for widening an existing drilled hole according to exemplary embodiments of the present technology.

FIG. 5B illustrates an end view of a shim of a system of a guide for widening an existing drilled hole according to exemplary embodiments of the present technology.

FIG. 5C illustrates a side view of a shim of a system of a guide for widening an existing drilled hole according to exemplary embodiments of the present technology.

FIG. 6A, FIG. 6B, FIG. 6C, and FIG. 6D illustrates different shim sizes of a system of a guide for widening an existing drilled hole according to exemplary embodiments of the present technology.

Figure 7:
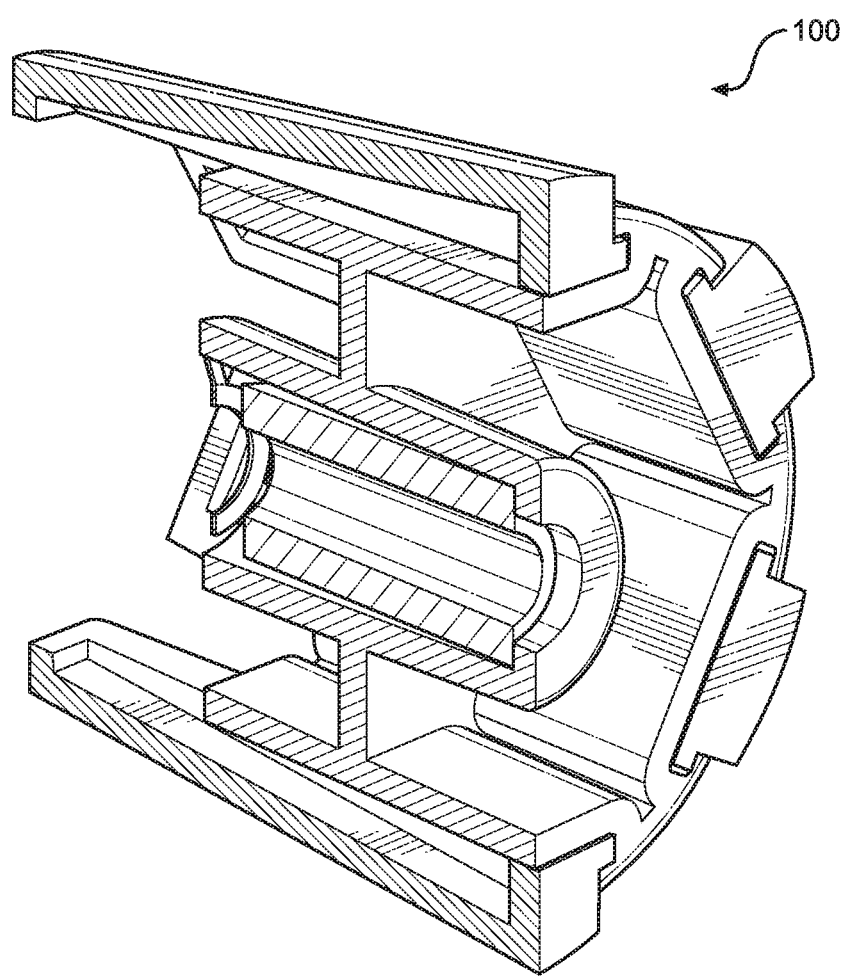

FIG. 7 illustrates a cross-section view of a system of a guide for widening an existing drilled hole with the shims inserted into the hub according to exemplary embodiments of the present technology.

Figure 8A:
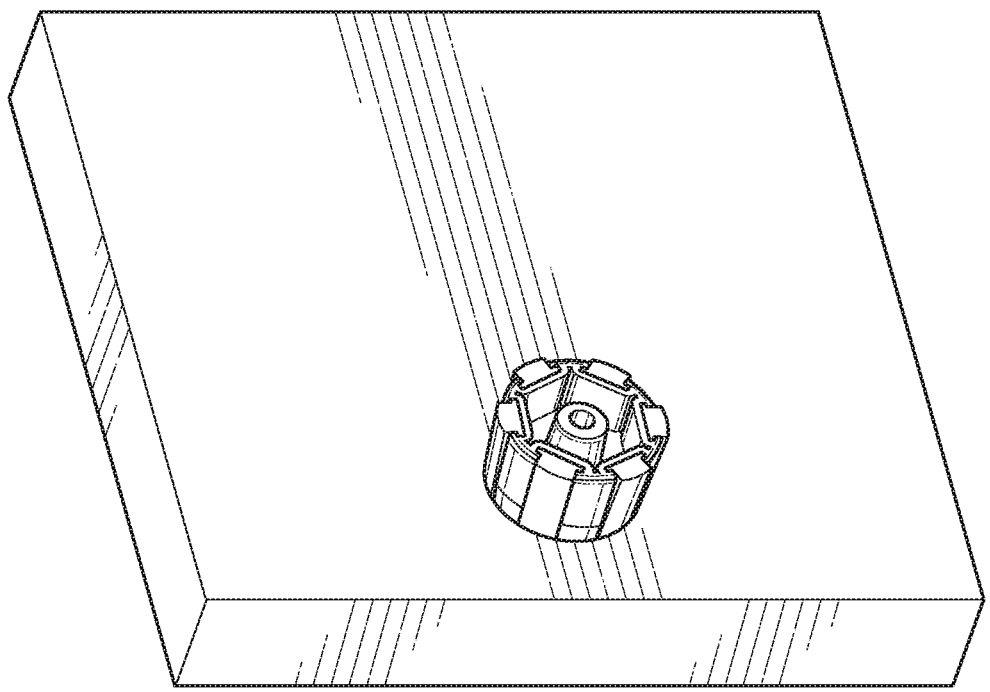

FIG. 8A illustrates a hub and shims of a system of a guide for widening an existing drilled hole being inserted into an existing drilled hole according to exemplary embodiments of the present technology.

Figure 8B:
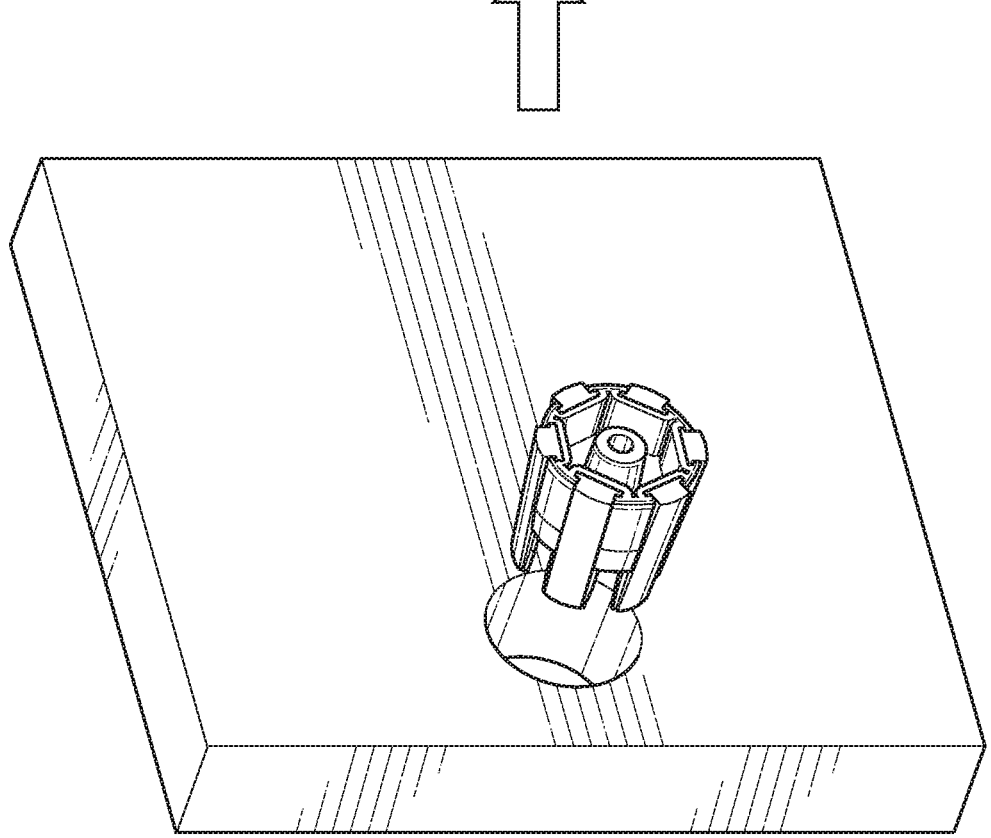

FIG. 8B illustrates a hub and shims of a system of a guide for widening an existing drilled hole inserted into an existing drilled hole according to exemplary embodiments of the present technology.

Figure 9:
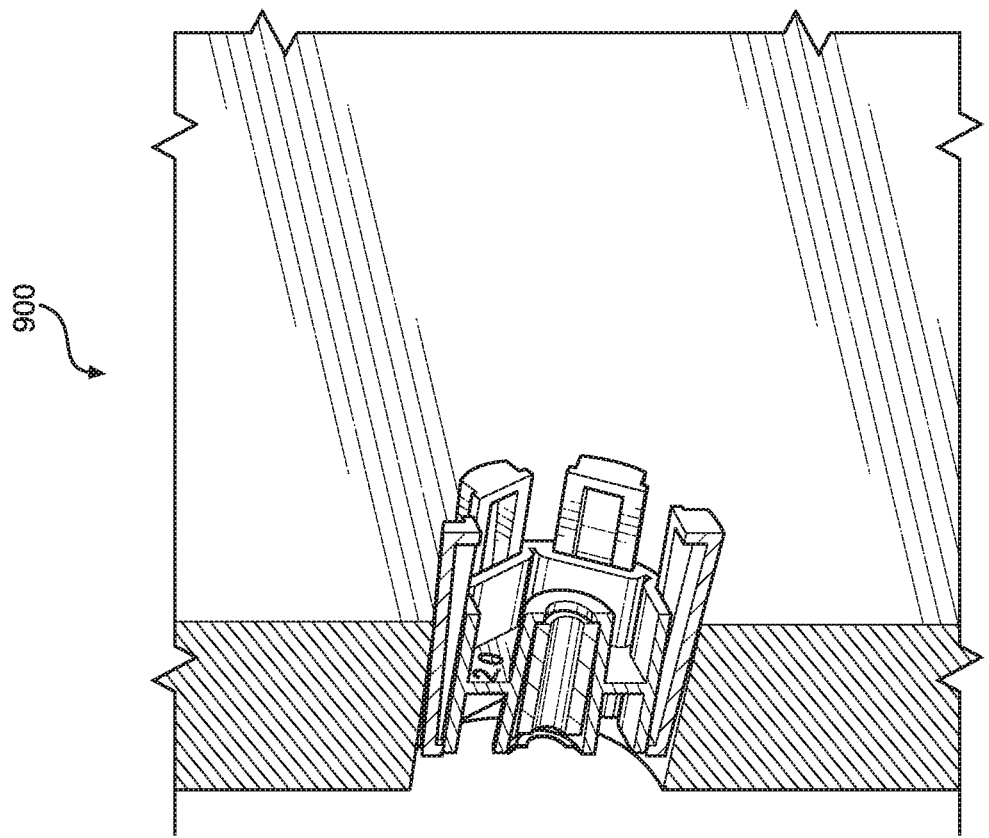

FIG. 9 shows a cross-section view of a hub and shims of a system of a guide for widening an existing drilled hole as they would look when inserted into an existing drilled hole according to exemplary embodiments of the present technology.

Figure 10:
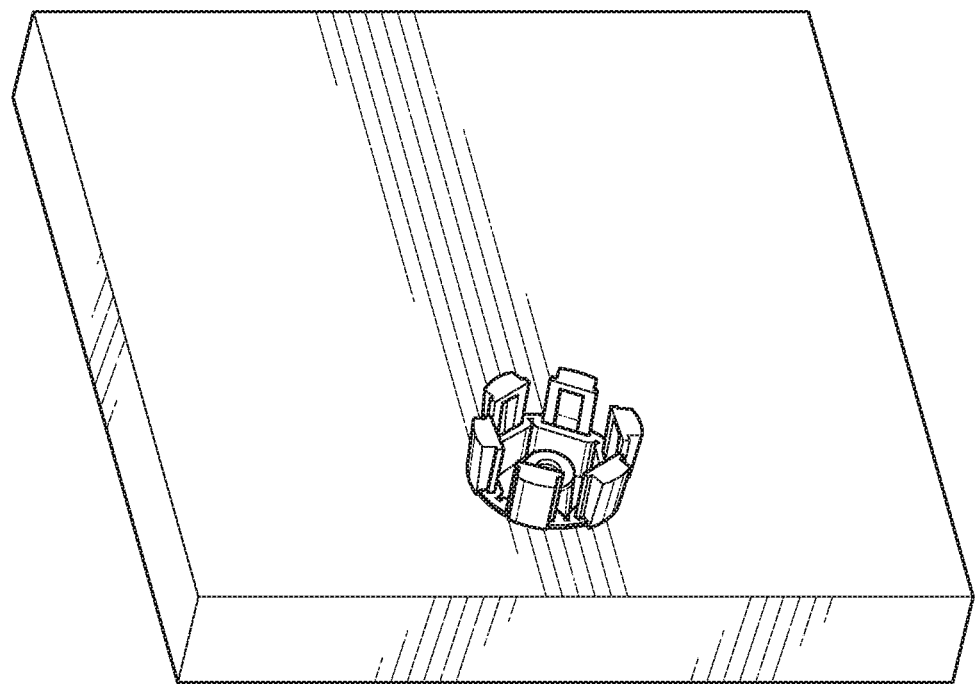

FIG. 10 illustrates a hub and shims of a system of a guide for widening an existing drilled hole as they appear when inserted into an existing drilled hole according to exemplary embodiments of the present technology.

Figure 11:
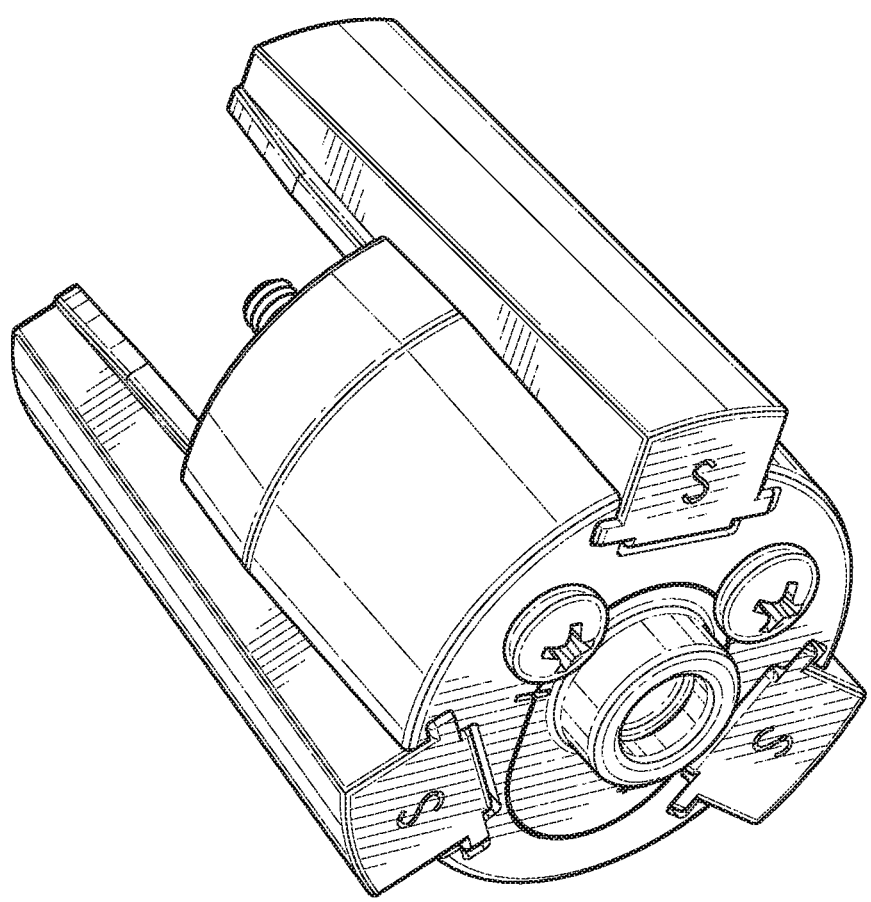

FIG. 11 illustrates a hub and a plurality of shims of a system of a guide for widening an existing drilled hole with the of plurality of shims being three shims according to exemplary embodiments of the present technology.

Figure 12:
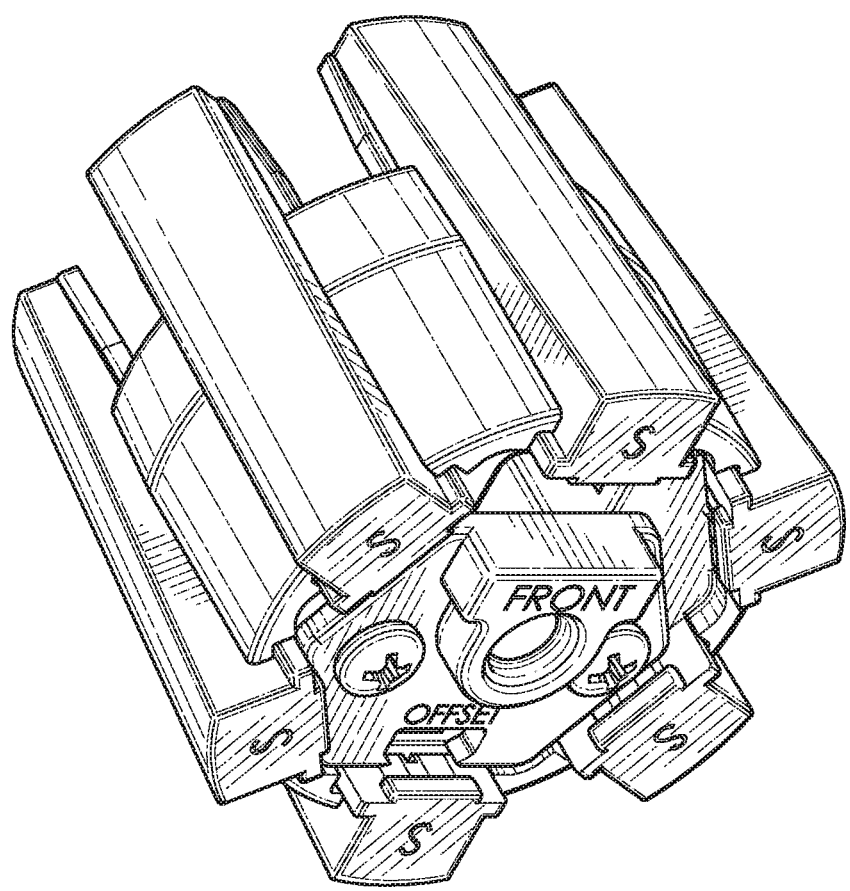

FIG. 12 illustrates a hub and a plurality of shims of a system of a guide for widening an existing drilled hole with the of plurality of shims being six shims according to exemplary embodiments of the present technology.

Figure 13:
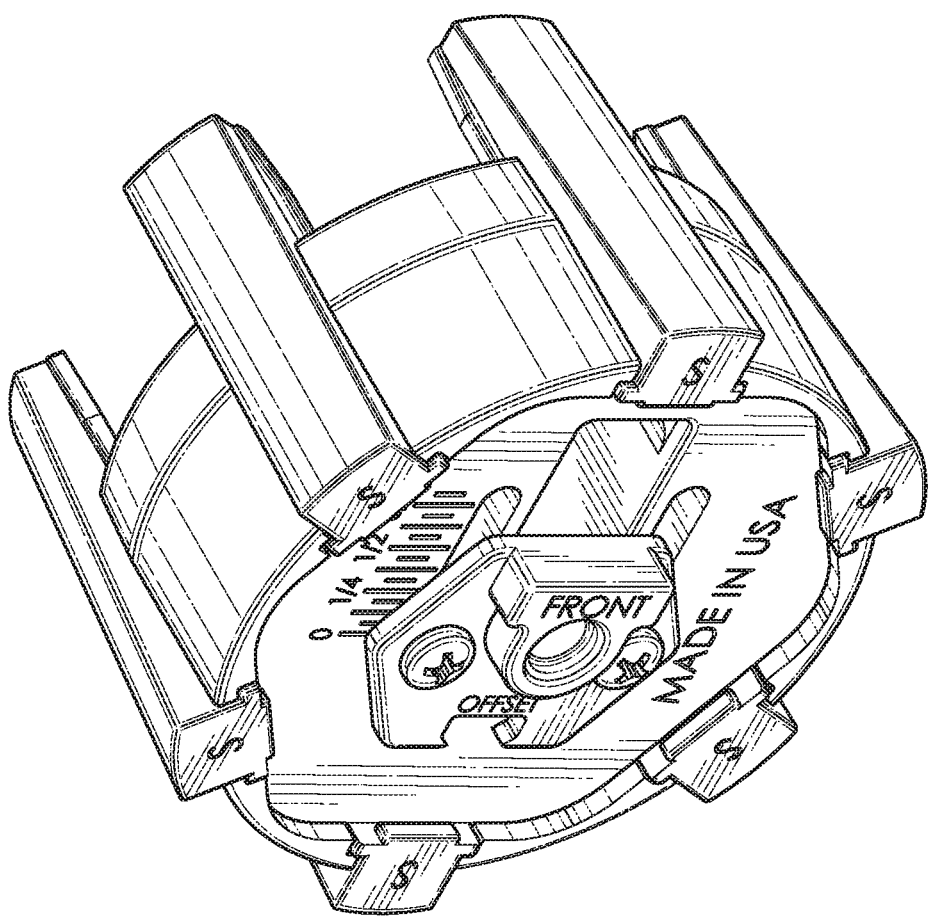

FIG. 13 illustrates a hub and a plurality of shims of a system of a guide for widening an existing drilled hole with the of plurality of shims being six shims widely spaced apart according to exemplary embodiments of the present technology.

DETAILED DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Typically, when drilling a hole through a surface the drill bit enters the surface to be drilled and the bit holds the drill in place as the hole saw begins to drill into the surface. A problem exits when there is an existing hole in the surface that needs to be widened, there is no material for the drill bit to enter, so the drill bit cannot hold the hole saw in place causing the hole saw to bounce around and damage the surface to be drilled.

Sometimes a piece of plywood can be clamped onto the surface and the bit can enter into the plywood to hold the hole saw in place. This technique is labor intensive and destroys a non-reusable piece of plywood. There are some surfaces where it is impossible to clamp on a piece of plywood, such as when a hole is drilled into a corner desk so that computer wires can pass through the hole. The corner desk may have side panels preventing a piece of plywood from being clamped on to the surface.

FIG. 1 illustrates a system 100 of a guide for widening an existing drilled hole according to exemplary embodiments of the present technology. For example, a hub is shown comprising the central hub piece with the bearing in the center and a bearing retainer. In some instances, the hub, comprises a circular central member with a center location, the circular central member comprising a bearing; and a bearing retainer. Further, system 100 shows the hub comprising a plurality of slots for shims around a circumference of the circular central member.

FIG. 2 illustrates the hub 200 used in a guide for widening a drilled hole system 100 according to exemplary embodiments of the present technology. According to exemplary embodiments, the hub 200 has a central bearing. In some embodiments, the bearing is capable of free spinning in the middle of the hub 200 while the hub 200 is fixed in place. In some embodiments, the bearing is held in place by a bearing retainer. In some embodiments, an indication of the size of the hub 200 is found on the top of the hub 200. In some embodiments, there are slots for the shims to slide into the hub 200 in order to fit the hub 200 securely into an existing hole before drilling. The hub 200 is shown with a plurality of shims, the plurality of shims being fit into the plurality of slots around the circumference of the circular central member, the plurality of shims each comprising a narrow end and a wide end.

FIG. 3A illustrates a top view of and a cross-sectional along A-A of the hub 300 used in a guide for widening a drilled hole system 100 according to exemplary embodiments of the present technology. In some embodiments, the bearing is located at the center of the hub 200 and the shims slide into groves on the outside edge of the hub 200. For example, the bearing and the bearing retainer are in the center location of the circular central member allowing the new hole to be drilled in a center of the existing hole.

FIG. 3B shows a cross-section view along section A-A of a hub 200 of a guide for widening a drilled hole system 100 according to exemplary embodiments of the present technology. For example, as discussed above, the bearing and the bearing retainer are in the center location of the circular central member allowing the new hole to be drilled in a center of the existing hole.

FIG. 4 illustrates a side view 400 of the hub 200 used in a guide for widening a drilled hole system 100 according to exemplary embodiments of the present technology. According to exemplary embodiments, the hub 200 has grooves so that the shims can fit seamlessly with the hub 200 in order to allow the guide for widening a drilled hole system 100 to be centered correctly and to provide a snug fit. For example, side view 400 shows the plurality of slots around the circumference of the circular central member are grooves in the circular central member.

FIG. 5A, FIG. 5B, and FIG. 5C illustrate a side-view, end-view, and top-view of a shim in a guide for widening a drilled hole system 100 according to exemplary embodiments of the present technology. According to various embodiments, the shim is wider at the top (i.e., wide end) and narrower at the bottom (i.e., narrow end) so that it can be inserted until the system 100 fits snuggly into the existing hole. In some instances, the narrow end of each of the plurality of shims being in a same direction and the wide end of each of the plurality of shims being in an opposite direction to the narrow end allowing for the guide to fit securely into an existing hole before drilling a new hole. In some embodiments, the shim has a flange on each side so that the shim can fit snugly into the hub 200. For example, the flanges help the shim to slide correctly into the opening in the hub 200 so that they are not twisted upon insertion.

FIG. 6A, FIG. 6B, FIG. 6C, and FIG. 6D illustrates different shim sizes of a guide for widening a drilled hole system 100 according to exemplary embodiments of the present technology. FIG. 6A, FIG. 6B, FIG. 6C, and FIG. 6D, respectively, illustrates four different sizes for the shims in a guide for widening a drilled hole system 100 according to exemplary embodiments of the present technology. According to exemplary embodiments, larger and smaller shims can be used to adapt to larger and smaller existing holes. In some instances, the plurality of shims fit into the plurality of slots around the circumference of the circular central member are a same size allowing a secure fit into a uniform size existing hole. In other instances, the plurality of shims fit into the plurality of slots around the circumference of the circular central member are not a same size allowing a secure fit into a non-uniform size existing hole.

FIG. 7 shows a cross-sectional view of the guide for widening a drilled hole system 100 according to exemplary embodiments of the present technology. For example, the shims are shown fully inserted into the slots on the hub 200. FIG. 7 further illustrates the central bearing and bearing retainer, according to exemplary embodiments of the present technology. In various instances the bearing fits a standard drill bit. In some instances, the bearing and the bearing retainer are in the center location of the circular central member allowing the new hole to be drilled in a center of the existing hole as shown in FIG. 7. In other instances (not shown) the bearing and the bearing retainer are off-center from the center location of the circular central member allowing the new hole to be drilled off-center of the existing hole. Exemplary FIG. 7 shows the bearing in the center.

FIG. 8A illustrates a hub 200 and shims of a guide for widening a drilled hole system 100 being inserted into an existing drilled hole according to exemplary embodiments of the present technology.

FIG. 8B illustrates a hub and shims of a guide for widening a drilled hole system 100 inserted into an existing drilled hole according to exemplary embodiments of the present technology. FIG. 8A shows the guide for widening a drilled hole system 100 outside of an existing hole. FIG. 8A shows the guide for widening a drilled hole system 100 fitted into an existing hole ready to be used according to exemplary embodiments of the present technology. For example, FIG. 8A and FIG. 8B show the plurality of shims with the plurality of shims being fit into the plurality of slots around the circumference of the circular central member. Moreover, each of the plurality of shims each comprise a narrow end and a wide end with the narrow end of each of the plurality of shims being in a same direction and the wide end of each of the plurality of shims being in an opposite direction to the narrow end allowing for the guide to fit securely into an existing hole before drilling a new hole.

FIG. 9 shows a cross-sectional view 900 of the guide for widening a drilled hole system 100 fitted into an existing hole ready to be used according to exemplary embodiments of the present technology. According to exemplary embodiments, the shims are shown evenly distributed around the hub 200. In some embodiments, the shims are each inserted to the same depth in the hole. For example, the plurality of slots around the circumference of the circular central member are equidistantly placed around the circumference of the circular central member as shown. In some embodiments (not shown) the plurality of slots around the circumference of the circular central member are not equidistantly placed around the circumference of the circular central member allowing for a secure fit in an irregular existing hole.

FIG. 10 shows the guide for widening a drilled hole system 100 fitted into an existing hole ready to be used according to exemplary embodiments of the present technology. For example, the system 100 here depicted in FIG. 10 is ready to be used. In various embodiments the plurality of shims fit into the plurality of slots around the circumference of the circular central member comprise markings (not shown), the markings indicating when all of the plurality of shims fit into the plurality of slots around the circumference of the circular central member are securely fit into the existing hole before drilling the new hole. FIG. 10 illustrates a hub 200 and shims of a guide for widening a drilled hole system 100 as they appear when inserted into an existing drilled hole according to exemplary embodiments of the present technology.

FIG. 11 illustrates a hub 200 and a plurality of shims of a guide for widening a drilled hole system 100 with the of plurality of shims being three shims according to exemplary embodiments of the present technology. In various instances the plurality of slots around the circumference of the circular central member comprise three slots, the three slots being equidistantly placed around the circumference of the circular central member. In one embodiment the circular central member with the center location has a one-and-a-half-inch diameter of the circular central member allowing the existing hole to be a small size.

FIG. 12 illustrates a hub 200 and a plurality of shims of a guide for widening a drilled hole system 100 with the of plurality of shims being six shims according to exemplary embodiments of the present technology. In various instances the plurality of slots around the circumference of the circular central member comprise six slots, the six slots being equidistantly placed around the circumference of the circular central member. In one embodiment the circular central member with the center location has a two-inch diameter of the circular central member allowing the existing hole to be a medium size.

FIG. 13 illustrates a hub 200 and a plurality of shims of a guide for widening a drilled hole system 100 with the of plurality of shims being six shims widely spaced apart according to exemplary embodiments of the present technology. In various instances the plurality of slots around the circumference of the circular central member comprise six slots, the six slots being equidistantly placed around the circumference of the circular central member. In one embodiment the circular central member with the center location has a three-inch diameter of the circular central member allowing the existing hole to be a large size.

According to exemplary embodiments the hub 200 can be in different sizes for ease of use in different holes. For example, an older door might have a much smaller hole for the doorknob so a smaller hub 200 would be used, or a cabinet for an entertainment center may have many wires and the existing hole might have been much larger so a larger hub 200 can be selected.

In some embodiments the hub 200 will be selected and inserted into the existing hole. Then an appropriate shim size will be selected. The shims will be inserted into the hub 200 until they fit snugly against the existing hole. In some embodiments, a hammer may be used to make sure that the system 100 is snuggly in place.

In some embodiments, a drill is fitted with a bit and a hole saw. The bit is inserted into the bearing. The bearing is capable of spinning freely. The hole saw is held flush against the surface to be drilled. The drill is turned on and as the hole saw saws through the surface it is held in place by the guide for widening a drilled hole system 100. The hole saw is able to cut a wider hole that is centered on the existing hole. The drill is then removed from the bearing and the guide for widening a drilled hole system 100 is removed from the cut portion of the surface that was drilled out.

According to exemplary embodiments the central bearing and bearing retainer could be offset to the left or the right so that the new hole may be positioned off center of the existing hole. For example, the bearing may be moved to the left until the right side of the new hole will be flush with the right side of the existing hole. For example, the bearing may be moved to the right until the left side of the new hole will be flush with the left side of the existing hole. In various embodiments the central bearing and bearing retainer are offset in any direction so that the new hole can be positioned off center of the existing hole in any direction (i.e., three-hundred-and-sixty degrees from the existing hole).

According to exemplary embodiments the hub 200 may be turned 90 degrees so that the bearing could be moved either up or down. For example, the bearing may be moved to the top until the bottom of the new hole will be flush with the bottom of the existing hole. For example, the bearing may be moved to the bottom until the top of the new hole will be flush with the top of the existing hole.

According to exemplary embodiments the shims may have markings on either the anterior or the exterior side so that an installer can verify that all of the shims are installed evenly so that the guide is centered in the existing hole.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below", or "beneath" other elements would then be oriented "above" the other elements. Therefore, the example terms "below" and "lower" can, therefore, encompass both an orientation of above and below.

The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure.

Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system of a guide for widening a drilled hole, the system comprising:
    a hub, comprising:
        a circular central member with a center location, the circular central member comprising:
        a bearing;
        a bearing retainer; and
        a plurality of slots for shims around a circumference of the circular central member; and
    a plurality of shims, the plurality of shims being fit into the plurality of slots around the circumference of the circular central member, the plurality of shims each comprising a narrow end and a wide end, the narrow end of each of the plurality of shims being in a same direction and the wide end of each of the plurality of shims being in an opposite direction to the narrow end, allowing for the guide to fit securely into an existing hole before drilling a new hole.

2. The system of claim 1, wherein the bearing is free spinning.

3. The system of claim 2, wherein the bearing fits a standard drill bit.

4. The system of claim 1, wherein the bearing and the bearing retainer are in the center location of the circular central member allowing the new hole to be drilled in a center of the existing hole.

5. The system of claim 1, wherein the bearing and the bearing retainer are off-center from the center location of the circular central member allowing the new hole to be drilled off-center of the existing hole.

6. The system of claim 1, wherein the plurality of slots around the circumference of the circular central member are grooves in the circular central member.

7. The system of claim 1, wherein the plurality of slots around the circumference of the circular central member are equidistantly placed around the circumference of the circular central member.

8. The system of claim 1, wherein the plurality of shims fitted into the plurality of slots around the circumference of the circular central member are a same size.

9. The system of claim 1, wherein the plurality of shims fitted into the plurality of slots around the circumference of the circular central member comprise markings, the markings indicating when all of the plurality of shims fitted into the plurality of slots around the circumference of the circular central member are securely fitted into the existing hole before drilling the new hole.

10. The system of claim 1, wherein the plurality of slots around the circumference of the circular central member comprise three shims that are equidistantly placed around the circumference of the circular central member.

11. The system of claim 1, wherein the plurality of slots around the circumference of the circular central member comprise six slots, the six slots being equidistantly placed around the circumference of the circular central member.

12. The system of claim 1, wherein the circular central member with the center location has a one-and-a-half-inch diameter of the circular central member allowing the existing hole to be a small size.

13. The system of claim 1, wherein the circular central member with the center location has a two-inch diameter of the circular central member allowing the existing hole to be a medium size.

14. The system of claim 1, wherein the circular central member with the center location has a three-inch diameter of the circular central member allowing the existing hole to be a large size.

15. A system of a guide for widening a drilled hole, the system comprising:
    a hub, comprising:
        a circular central member with a center location, the circular central member comprising:
        a bearing, the bearing being free spinning and fitting a standard drill bit; and
        a bearing retainer, the bearing retainer and the bearing being in the center location of the circular central member allowing a new hole to be drilled in a center of an existing hole; and
        a plurality of slots for shims around a circumference of the circular central member; and
    a plurality of shims, the plurality of shims being fit into the plurality of slots around the circumference of the circular central member, the plurality of shims each comprising a narrow end and a wide end with a flange on both the narrow end and the wide end, the narrow end of each of the plurality of shims being in a same direction and the wide end of each of the plurality of shims being in an opposite direction to the narrow end, allowing for the guide to fit securely into the existing hole before drilling the new hole.

16. The system of claim 15, wherein the plurality of slots around the circumference of the circular central member are grooves in the circular central member.

17. The system of claim 15, wherein the plurality of shims fitted into the plurality of slots around the circumference of the circular central member comprise markings, the markings indicating when all of the plurality of shims fitted into the plurality of slots around the circumference of the circular central member are securely fitted into the existing hole before drilling the new hole.

18. A system of a guide for widening a drilled hole, the system comprising:
    a hub, comprising:
        a circular central member with a center location, the circular central member comprising:
        a bearing, the bearing being free spinning and fitting a standard drill bit; and
        a bearing retainer, the bearing retainer and the bearing being off-center from the center location of the circular central member allowing a new hole to be drilled off-center of an existing hole; and a plurality of slots for shims around a circumference of the circular central member; and a plurality of shims, the plurality of shims being fit into the plurality of slots around the circumference of the circular central member, the plurality of shims each comprising a narrow end and a wide end with a flange on both the narrow end and the wide end, the narrow end of each of the plurality of shims being in a same direction and the wide end of each of the plurality of shims being in an opposite direction to the narrow end, allowing for the guide to fit securely into the existing hole before drilling the new hole.

19. The system of claim 18, wherein the plurality of slots around the circumference of the circular central member are equidistantly placed around the circumference of the circular central member; and wherein the plurality of shims fit into the plurality of slots around the circumference of the circular central member are a same size.

20. The system of claim 18, wherein the plurality of slots around the circumference of the circular central member are grooves in the circular central member.

\* \* \* \* \*